(12) United States Patent
Wang et al.

(10) Patent No.: US 10,954,838 B2
(45) Date of Patent: Mar. 23, 2021

(54) SYSTEM AND METHODS OF INTEGRATED CONTROL OF COMBUSTION AND SCR SYSTEMS

(71) Applicant: GM Global Technology Operations LLC, Detroit, MI (US)

(72) Inventors: Yue-Yun Wang, Troy, MI (US); Giuseppe Mazzara Bologna, Nicosia (IT); Vincenzo Alfieri, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 16/153,187

(22) Filed: Oct. 5, 2018

(65) Prior Publication Data

US 2020/0109651 A1  Apr. 9, 2020

(51) Int. Cl.
| | |
|---|---|
| F02M 25/06 | (2016.01) |
| F01N 3/20 | (2006.01) |
| F02D 41/00 | (2006.01) |
| F02D 41/30 | (2006.01) |
| B01D 53/94 | (2006.01) |
| F02D 41/14 | (2006.01) |

(52) U.S. Cl.
CPC ......... *F01N 3/208* (2013.01); *B01D 53/9418* (2013.01); *B01D 53/9495* (2013.01); *F02D 41/0065* (2013.01); *F02D 41/1462* (2013.01); *F02D 41/3005* (2013.01); *F01N 2610/02* (2013.01); *F01N 2610/146* (2013.01); *F01N 2900/0416* (2013.01); *F01N 2900/1614* (2013.01); *F02D 2200/0806* (2013.01)

(58) Field of Classification Search
CPC ............. B01D 53/9418; F02D 41/1462; F02D 41/0065; F02D 41/3005; F02D 2200/0806; F01N 13/009; F01N 3/208; F01N 2900/0416; F01N 2560/026
USPC .......................................................... 60/278
See application file for complete search history.

(56) References Cited

U.S. PATENT DOCUMENTS

| | | | |
|---|---|---|---|
| 10,018,092 B2 | 7/2018 | Wang et al. | |
| 10,060,373 B2 | 8/2018 | Wang et al. | |
| 2011/0113753 A1* | 5/2011 | Christner | B01D 53/9495 60/274 |

(Continued)

OTHER PUBLICATIONS

Wang, Yue-Yun; Ardanese, Raffaello, Unpublished U.S. Appl. No. 15/843,653, filed Dec. 15, 2017.

(Continued)

*Primary Examiner* — Jason D Shanske
(74) *Attorney, Agent, or Firm* — Vivacqua Crane

(57) ABSTRACT

An emissions control system for a motor vehicle that includes an internal combustion engine includes a first selective catalytic reduction (SCR) device and a reductant injector, The system further includes a model-based controller that is configured to calculate a target amount of reductant to inject to maintain a predetermined ratio between an amount of NH3 and an amount of NOx at the outlet of the first SCR device, and to send a command for receipt by the reductant injector to inject the calculated amount of reductant. The model-based controller is further configured to send a command for receipt by an engine controller to influence NOx production by the engine by modifying an engine operating parameter, based on a calculated target amount of NOx at the inlet of the first SCR device.

18 Claims, 2 Drawing Sheets

(56) References Cited

U.S. PATENT DOCUMENTS

| | | | | |
|---|---|---|---|---|
| 2011/0288751 A1* | 11/2011 | Kurtz | ............... | F02D 19/061 |
| | | | | 701/109 |
| 2013/0255233 A1* | 10/2013 | Yasui | ............... | F01N 3/10 |
| | | | | 60/286 |
| 2015/0089940 A1* | 4/2015 | Sivasubramaniam | ............... | |
| | | | | F02D 41/0052 |
| | | | | 60/602 |
| 2017/0138317 A1* | 5/2017 | Gokhale | ............... | F02D 41/0052 |
| 2018/0163604 A1 | 6/2018 | Wang et al. | | |
| 2018/0274417 A1 | 9/2018 | Mao et al. | | |
| 2019/0093535 A1* | 3/2019 | Devarakonda | ............... | F01N 11/007 |
| 2019/0136732 A1* | 5/2019 | Lauritano | ............... | F01N 3/035 |
| 2019/0178131 A1* | 6/2019 | Funk | ............... | F01N 3/2073 |
| 2019/0186318 A1* | 6/2019 | Wang | ............... | F01N 3/208 |

OTHER PUBLICATIONS

Wang, Yue-Yun; Vassallo, Alberto Lorenzo, Unpublished U.S. Appl. No. 15/830,266, filed Dec. 4, 2017.

Mazzara Bologna, Giuseppe; Bernardini, Daniele; Bemporad, Alberto; Camuglia, Maria; Tulli, David; Hoyos Velasco, Carlos Ildefonso; Pedicini, Carmen, Unpublished U.S. Appl. No. 16/003,285, dated Jun. 8, 2018.

Camuglia; Maria; Binetti, Giulio; Hoyos Velasco, Carlos Ildefonso; Mazzara Bologna, Giuseppe; Bemporad, Alberto; Bernardini, Daniele, Unpublished U.S. Appl. No. 15/983,751, filed May 18, 2018.

\* cited by examiner

SYSTEM AND METHODS OF INTEGRATED CONTROL OF COMBUSTION AND SCR SYSTEMS

INTRODUCTION

The present disclosure relates to a control system for operating an internal combustion engine and exhaust system, and more particularly to exhaust systems that use selective catalytic reduction (SCR) units to reduce NOx emissions.

Exhaust gas emitted from an internal combustion engine, particularly a diesel engine, is a mixture that contains gaseous emissions such as carbon monoxide (CO), unburned hydrocarbons (HC), and oxides of nitrogen (NOx), as well as condensed liquid and solid phase materials that constitute particulate matter (PM). Catalyst compositions are provided as part of an exhaust emissions control system to convert certain or all of these exhaust constituents into non-regulated exhaust gas components Thus, while current exhaust emissions control systems achieve their intended purpose, there is a need for a new and improved system and method for treating exhaust gases.

SUMMARY

According to several aspects, an emissions control system for a motor vehicle having an internal combustion engine, includes a first selective catalytic reduction (SCR) device and a reductant injector. The emissions control system also includes a model-based controller that is configured to determine an amount of NOx and an amount of NH3 at an outlet of the first SCR device, calculate an allowable NOx increase multiplier value that will maintain the amount of NH3 at the outlet of the first SCR device below a predetermined level, and calculate a target amount of NOx at an inlet of the first SCR device based on a present amount of NOx at the inlet of the first SCR device and the allowable NOx increase multiplier value. The controller is further configured to send a command for receipt by an engine controller to influence NOx production by the engine by modifying an engine operating parameter, based on the calculated target amount of NOx at the inlet of the first SCR device, calculate a target amount of reductant to inject to maintain a predetermined ratio between the amount of NH3 and the amount of NOx at the outlet of the first SCR device, and send a command for receipt by the reductant injector to inject the calculated amount of reductant.

In an additional aspect of the present disclosure, the allowable NOx increase multiplier value is a ratio of a targeted engine-out NOx concentration or NOx flow value to an engine-out NOx concentration or flow value that would be produced by operating the engine to minimize NOx production at the current engine speed and engine torque.

In another aspect of the present disclosure, determining the amount of NH3 at the outlet of the first SCR device is based on computing a first estimated NH3 storage level for the first SCR device.

In an additional aspect of the present disclosure, determining the amount of NH3 at the outlet of the first SCR device is further based on receiving a NOx measurement at an inlet of the first SCR device.

In an additional aspect of the present disclosure, the emissions control system is configured such that a targeted engine-out NOx concentration value is permitted to exceed an engine-out NOx concentration value that would be produced by operating the engine to minimize NOx production at the current engine speed and engine torque only when the engine is operating at steady state or quasi steady state conditions.

In another aspect of the present disclosure, the engine operating parameter is a fuel injection timing value.

In another aspect of the present disclosure, the engine operating parameter is an EGR flow rate value.

In an additional aspect of the present disclosure, the emissions control system further includes an oxidation catalyst disposed downstream of the SCR device.

In another aspect of the present disclosure, a second SCR device is disposed downstream of the first SCR device.

In an additional aspec of the present disclosure, an oxidation catalyst is disposed downstream of the second SCR device.

According to several aspects, an exhaust system for treating exhaust gas emitted by an internal combustion engine and configured to perform a selective catalytic reduction (SCR) of exhaust gas includes a first SCR device. The exhaust system also includes a controller configured to control injection of a reductant into the exhaust gas. Controlling of the reductant injection includes computing an amount of reductant to inject based on a first model of the SCR device, wherein the first model estimates a first NH3 storage level at the first SCR device. Controlling of the reductant injection also includes sending a command to a reductant injector to inject the computed amount of reductant. The controller is further configured to influence an engine control parameter, including determining if the engine is operating at steady state or quasi steady state. In response to the engine operating at steady state or quasi steady state, the controller modifies an engine control parameter that is effective to influence engine-out NOx levels.

In another aspect of the present disclosure, the engine control parameter that is effective to influence engine-out NOx levels is modified so as to increase combustion efficiency of the engine.

In another aspect of the present disclosure, the engine control parameter that is effective to influence engine-out NOx levels is exhaust gas recirculation (EGR) flow rate.

In another aspect of the present disclosure, the engine control parameter that is effective to influence engine-out NOx levels is fuel injection timing.

According to several aspects, a method for controlling reductant injection and fuel combustion in a system having an internal combustion engine and a selective reduction catalyst (SCR) device includes computing an amount of reductant to inject based on a first model of the SCR device, wherein the first model estimates a first NH3 storage level at the first SCR device. The method further includes sending a command to a reductant injector to inject the computed amount of reductant. The method also includes determining if the engine is operating at steady state or quasi steady state. In response to the engine operating at steady state or quasi steady state, the method includes modifying an engine control parameter that is effective to influence engine-out NOx levels.

In another aspect of the disclosure, the engine control parameter that is effective to influence engine-out NOx levels is modified so as to increase combustion efficiency of the engine.

In another aspect of the disclosure, the engine control parameter that is effective to influence engine-out NOx levels is exhaust gas recirculation (EGR) flow rate.

In another aspect of the disclosure, the engine control parameter that is effective to influence engine-out NOx levels is fuel injection timing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
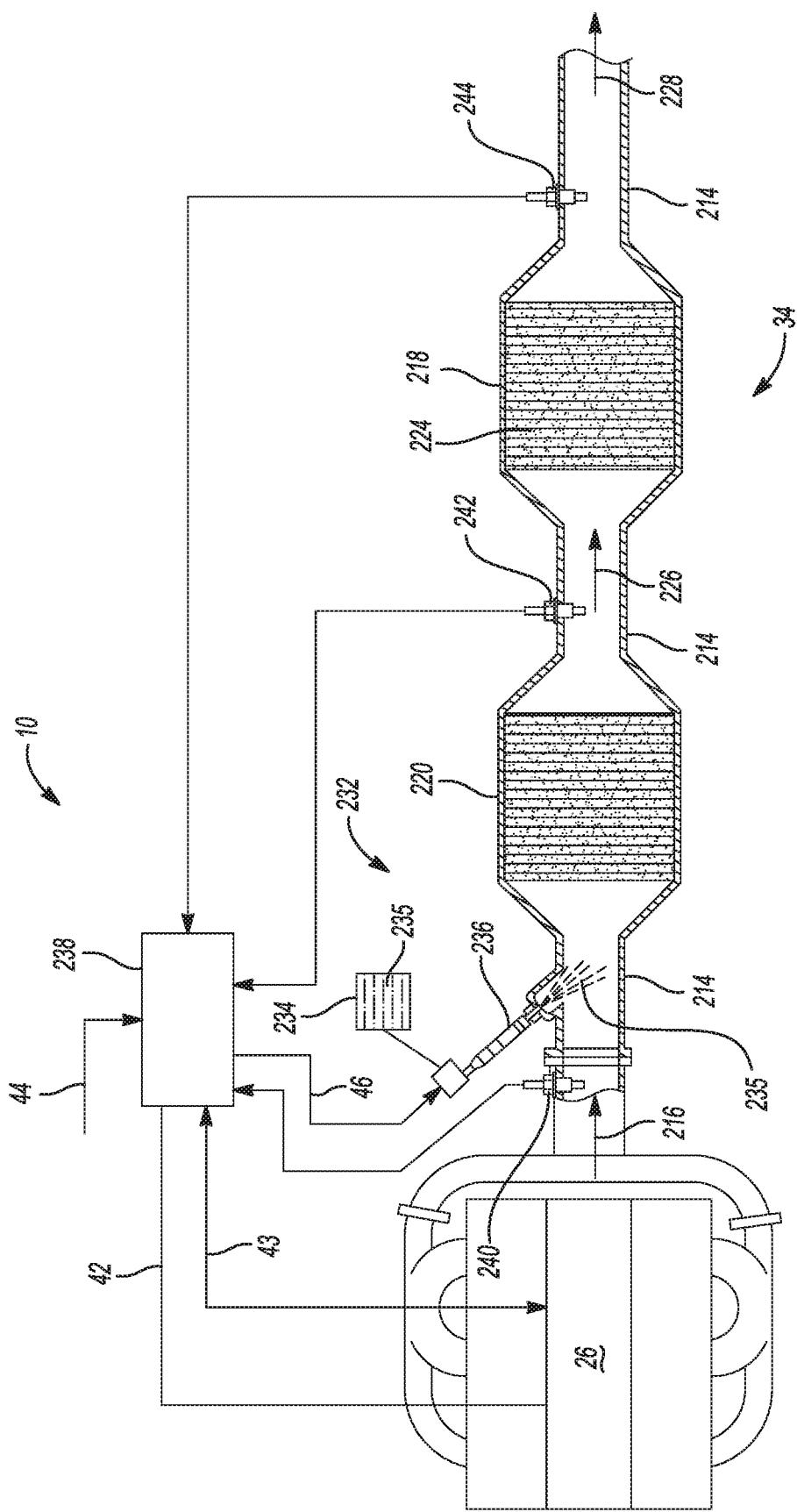
FIG. 1 is a schematic representation of an exhaust emissions control system applied to an internal combustion engine that is operable in accordance with the herein described embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

With reference to FIG. 1, an automotive system 10 includes an internal combustion engine 26 including an engine block defining at least one cylinder having a piston coupled to rotate a crankshaft. A cylinder head cooperates with the cylinder wall and the piston to define a combustion chamber. A fuel and air mixture is disposed in the combustion chamber and ignited, resulting in hot expanding exhaust gases causing reciprocating movement of the piston. The fuel is provided by at least one fuel injector, and the air is provided from an intake manifold through at least one intake port. The fuel is provided at high pressure to the fuel injector from a fuel rail in fluid communication with a high-pressure fuel pump that increase the pressure of the fuel received a fuel source. Timing of injection of fuel is controlled to provide a desired amount of fuel at a desired crankshaft angle relative to piston top-dead-center (TDC). Fuel injection timing is known to affect combustion dynamics.

Each of the cylinders has at least two associated valves actuated by a camshaft rotating in time with the crankshaft. The valves selectively allow air into the combustion chamber and alternately allow exhaust gases to exit through an exhaust port. Air may be distributed to the air intake port(s) through the intake manifold. An air intake duct may provide air from the ambient environment to the intake manifold. In other embodiments, a throttle body may be provided to regulate the flow of air into the manifold. In still other embodiments, a forced air system such as a turbocharger, having a compressor rotationally coupled to a turbine, may be provided. Rotation of the compressor increases the pressure and temperature of the air in the duct and manifold, and an intercooler disposed in the duct may reduce the temperature of the air.

Exhaust gases 216 produced by the engine 26 are communicated to an exhaust system, which in accordance with the herein described embodiments includes an exhaust gas emissions control system 34 including one or more exhaust after-treatment devices. The exhaust gases are released from the emissions control system 34 as treated exhaust gases 228. The after-treatment devices may be any device configured to change the composition of the engine-out exhaust gases 216. The emissions control system 34 depicted in FIG. 1 includes a selective catalytic reduction (SCR) device 220 and a rear oxidation catalyst (ROC) 218. Other examples of after-treatment devices that may be included in the emissions control system 34 include, but are not limited to, catalytic converters (two and three way), lean NOx traps, and hydrocarbon adsorbers. The emissions control system 34 may further include a diesel particulate filter (DPF). Embodiments may include an exhaust gas recirculation (EGR) system controlled by an EGR valve coupled between the exhaust manifold and the intake manifold. EGR may be used to dilute the combustible air-fuel mixture in the combustion chamber, thereby influencing combustion dynamics. The herein described embodiments are amenable to virtually any combination of after-treatment devices, and it is typical that the emissions control system 34 will include more than one such device.

The emissions control system 34 generally includes one or more exhaust gas conduits 214, which may comprise several segments, to transport exhaust gas 216 from the engine 26 to the various exhaust treatment devices of the emissions control system 34. In the embodiment shown in FIG. 1, the exhaust gas 216 from the engine is conveyed into the SCR device 220. Exhaust gas (indicated as 226) exiting the SCR device 220 is conveyed into the ROC 218. Exhaust gas (indicated as 228) exiting the ROC 218 is discharged to the atmosphere through the tailpipe.

A catalyst-containing washcoat disposed on a substrate within the SCR 220 is configured to reduce NOx constituents in the exhaust gas 216. The SCR 220 may utilize a reductant 235, such as ammonia (NH3), to convert NOx constituents of the exhaust gas 216 in the presence of NH3. The reductant NH3 utilized by the SCR 220 may be mixed with air to aid in the dispersion of an injected spray generated by a reductant delivery system.

The emissions control system 34 further includes a reductant delivery system 232 that introduces the reductant 235 to the exhaust gas 216. The reductant delivery system 232 includes a reductant supply 234, an injector 236, and a control module 238. The reductant supply 234 stores the reductant 235 and is in fluid communication with the injector 236. Ammonia (NH3) may be generated from a reductant 235 material in the form of a solid, a gas, a liquid, or an aqueous urea solution. Accordingly, the injector 236 may inject a selectable amount of reductant 235 into the exhaust gas conduit 214 such that the reductant 235 is introduced to the exhaust gas 216 at a location upstream of the SCR 220.

The control module 238 may control the engine 26 and the reductant delivery system 232 based on sensed data provided by sensors and/or modeled data stored in memory. The control module 238 is operatively coupled to receive data in the form of electronic signals from one or more sensors and/or devices associated with the engine 26 represented as ICE sensor and modules data hereinafter referred to as $U_{ICE}$ 42. The control module 238 may receive $U_{ICE}$ 42 signals from various sensors configured to generate the signals related to various physical parameters associated with the engine 26. The sensors may include, but are not limited to, a mass airflow and temperature sensor, a manifold pressure and temperature sensor, a combustion pressure sensor, coolant and oil temperature and level sensors, a fuel rail pressure sensor, a cam position sensor, a crank position sensor, an exhaust pressure sensor, an exhaust temperature sensor, an EGR temperature sensor, and an accelerator pedal position sensor. Furthermore, the control module 238 may generate output signals 43 to various control devices that are arranged to control the operation of the engine 26, including, but not limited to, the fuel injectors, the EGR valve, the throttle body and other devices forming part of the emissions control system 34. The control module 238 may furthermore receive additional control inputs, such as but not limited to, ambient air temperature, ambient pressure, vehicle speed, gear selected, and the like, hereinafter control inputs 44.

In various embodiments, the control module 238 controls one or more sub-systems and/or devices of the emissions control system 34 based on one or more sensed and/or modeled inputs based on the methods and systems of the present disclosure. In one example, the control module 238 is in electrical communication with a plurality of temperature and/or gas composition sensors. A first temperature sensor and a first gas composition sensor are disposed at a location 240 upstream from the SCR 220. A NOx sensor at location 240 can provide a value for engine-out NOx concentration, which is also referred to herein as $C_{NOx,in}$, the concentration of NOx into the SCR 220. A second temperature sensor and a second gas composition sensor are disposed at a location 240 upstream from the SCR 220. A NOx sensor disposed at a location 242 can provide a value for $C_{NOx,out}$, the concentration of NOx exiting the SCR 220. A NOx sensor at location 242 may have cross-sensitivity to NH3 in the exhaust gas exiting the SCR 220. The ROC 218 oxidizes NH3 slip exiting the SCR 220, such that the concentration of NH3 in the exhaust gas 228 at the exit of the ROC is much smaller than the concentration of NH3 in the exhaust gas 226 at the entrance to the ROC 218. Thus, a signal from a NOx sensor at location 244 at the outlet of the ROC 218 can be used to provide the value for $C_{NOx,out}$ with reduced cross sensitivity to NH3. A third temperature sensor may be disposed at location 244 at the outlet of the ROC 218. It should be noted that additional temperature sensors may be used to monitor a catalyst temperature, such as ROC and SCR catalyst temperatures and/or other components of the emissions control system 34. In one or more examples, a catalyst temperature may be monitored by monitoring the temperature of the exhaust of the ROC 218 at location 244. The temperature sensors sense the temperature of corresponding components, or predetermined thermal area in the emissions control system 34, and generate a corresponding temperature signal based thereon. For example, the temperature sensors may output a temperature signal indicating an SCR temperature of the SCR 220, a catalyst temperature and the like.

The SCR 220 may be a single-can SCR device or a multi-can SCR device, such as a two-can SCR device. The SCR 220 facilitates the NOx reduction reaction as the gases pass through the catalyst substrate. Before entering the catalyst substrate, the reductant 235 is injected and mixed with the exhaust gases. Part or all of the incoming NH3 gases are adsorbed by the surface walls of the SCR 220, and a portion of the NH3 gases may escape because of desorption.

As can be appreciated, the ROC 218 can be of various flow-through, oxidation catalyst devices known in the art. In various embodiments the ROC 218 may include a flow-through metal or ceramic monolith substrate 224 that is wrapped in an intumescent mat or other suitable support that expands when heated, securing and insulating the substrate. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The ROC 218 is useful in treating unburned gaseous and non-volatile HC and CO, which are oxidized to form carbon dioxide and water. The ROC 218 may alternatively or additionally oxidize NH3 slip exiting the SCR 220, such that the concentration of NH3 in the exhaust gas 228 at the exit of the ROC is much smaller than the concentration of NH3 in the exhaust gas 226 at the entrance to the ROC 218. A washcoat layer includes a compositionally distinct layer of material disposed on the surface of the monolithic substrate or an underlying washcoat layer. A catalyst can contain one or more washcoat layers, and each washcoat layer can have unique chemical catalytic functions.

The control module 238 provides a reductant injection signal 46 to control operation of the injector 236. A reductant storage model may be utilized to determine an amount of reductant 235 to be stored on the SCR 220. The control module 238 may determine a correction coefficient corresponding to the reductant storage model based on the temperature gradient of the SCR 220, and may more precisely control the amount of injected reductant provided by the injector 236. Accordingly, the supply of reductant 235 may be utilized more efficiently.

An insufficient injection of reductant 235 may result in unacceptably low NOx conversion. An injection rate of reductant 235 which is too high results in release of ammonia to the atmosphere. These ammonia emissions from SCR systems are known as ammonia slip. The technical features described herein facilitate the control module 238 to calculate an estimated concentration of NH3 downstream from the SCR 220, thus facilitating the control module 238 to inject the appropriate amount of ammonia to reduce such ammonia slip. The ammonia slip increases when NH3 is injected at a rate higher than the rate required to achieve the desired optimal NH3/NOx ratio.

The control module 238 may include a digital central processing unit (CPU) having a microprocessor in communication with a memory system, or data carrier, and an interface bus. The microprocessor is configured to execute instructions stored as a program in the memory system and send and receive signals to/from the interface bus. The memory system may include various storage types including optical storage, magnetic storage, solid-state storage, and other nonvolatile memory. The interface bus may be configured to send, receive, and modulate analog and/or digital signals to/from the various sensors and control devices. The program may embody the methods disclosed herein, allowing the control module 238 to carry out the steps of such methods and control the engine 26 and emissions control system 34. Instead of a CPU, the control module 238 may have a different type of processor to provide the electronic logic, e.g. an embedded controller, an onboard computer, or any processing module that might be deployed in the automotive system 10. While described as a single control module 238, it will be appreciated that the functionality described with respect to the control module 238 may be partitioned to a plurality of control devices configured to operate and communicate with each other to achieve the desired functionality.

In a vehicle application, the size, i.e. NOx conversion capacity, of the SCR 220 is selected to allow compliance with regulations governing NOx emissions at the most challenging engine operating conditions. When the default combustion calibration is targeted toward minimizing engine-out NOx, under operating conditions that are not the most challenging (such as steady state and quasi steady state), the NOx conversion capacity of the SCR 220 is not fully utilized. The combustion calibration that minimizes engine-out NOx is generally not the calibration that maximizes combustion efficiency. The present disclosure allows the engine to be controlled for higher combustion efficiency under operating conditions associated with underutilized NOx conversion capacity, even though the higher combustion efficiency comes with an associated increase in engine-out NOx. Under these conditions, model predictive control (MPC) is used to control NH3 storage in the SCR 220 by adjusting the injection rate of reductant 235 to maintain satisfactory SCR-out NOx and satisfactory NH3 slip. The combustion efficiency of the engine 26 is simultaneously increased by reducing EGR and by advancing the fuel injection timing. As a result, fuel consumption and $CO_2$ emissions are reduced.

A NOx increase multiplier α can be defined as $$\alpha = \frac{\overline{C}_{NOX,in}}{C_{NOX,in}}$$

where $\overline{C}_{NOX,in}$ is the target value of the concentration of NOx into the SCR 220, and $C_{NOX,in}$ is the current value of the concentration of NOx into the SCR 220.

In the algorithm described herein, α>1, meaning engine-out NOx increase is allowed, when the engine is operating in steady state or quasi steady state conditions. As used herein, the term "steady state or quasi steady state conditions" refers to operating conditions when the engine output is substantially constant over a defined time interval, such as when the vehicle is cruising on a highway at a constant speed. As a non-limiting example, quasi steady state may be defined as engine speed changing less than 20 rpm and engine output torque changing less than 5 Nm in a one second interval. The allowable rpm change, allowable torque change, and/or time interval may be calibration parameters selected for a specific vehicle application. In an exemplary embodiment of the present disclosure, when the engine is not operating in steady state or quasi steady state conditions, engine-out NOx increase is not allowed and α=1.

In a model for the SCR system, the model state θ is the ammonia coverage ratio (ammonia stored within the SCR 220 divided by Θ, the maximum ammonia storage capacity of the SCR 220). Model input $u_1$ is $C_{NOX,in}$, the concentration of the NOx at the inlet of the SCR 220 [ppm]. Model input $u_2$ is $C_{NH3,in}$, the concentration of NH3 at the inlet of the SCR 220 [ppm]. Model output $y_1$ is $C_{NOX,out}$, the concentration of NOx at the outlet of the SCR 220 [ppm]. Model output $y_2$ is $C_{NH3,out}$, the concentration of NH3 at the outlet of the SCR 220 [ppm]. Model parameters include T, the catalyst temperature in the SCR 220 [K]; F, the flow rate of exhaust gas [m³/s]; $r_{RED}(T)$, the NOx reduction rate in the SCR 220; $r_{ADS}(T)$, the NH3 adsorption rate in the SCR 220; $r_{DES}(T)$, the NH3 desorption rate in the SCR 220; $W_{NH3}$, the molar weight of NH3 (17.031 [g/mol]); and $W_{NOx}$, the molar weight of NOx that has been approximated as NO only (30 [g/mol]).

To control the system operating at current levels of $C_{NOX,in}$, $C_{NOX,out}$, $C_{NH3,out}$, and θ, new target setpoints $\overline{C}_{NOX,in}$, $\overline{C}_{NOX,out}$, $\overline{C}_{NH3,out}$, and $\overline{\theta}$ are calculated. It should be noted that the engine-out NOx level is the same as $C_{NOX,in}$, the input NOx level to the SCR 220. The required NH3 coverage ratio for NOx reduction with the new engine-out NOx target is given as:

$$\overline{\theta} = \alpha\theta + \frac{(\alpha - 1)F}{r_{RED}\Theta}, \alpha = \frac{\overline{C}_{NOX,in}}{C_{NOX,in}}$$

The NH3 coverage ratio is constrained to not exceed a maximum value for minimum NH3 slip from the SCR 220.

$$\theta_{max} = \frac{\overline{C}_{NH3,out}(F + r_{ADS}\Theta) - FC_{NH3,in}}{r_{ADS}\Theta\overline{C}_{NH3,out} + r_{DES}\Theta}$$

$$C_{NH3,in} \approx \frac{W_{NH3}}{W_{NOx}}(\overline{C}_{NOX,in} - C_{NOx,out}) + \overline{C}_{NH3,out}$$

A model of the ROC 218 is used to relate ammonia slip in the tailpipe exhaust flow 228, $C_{NH3,ROC}$, to $\overline{C}_{NH3,out}$, the concentration of ammonia at the outlet of the SCR 220 (which is the inlet to the ROC 218). A reverse ROC model of this relationship, which is a function of flow and temperature, can be expressed as:

$$\overline{C}_{NH3,out} = ROC(C_{NH3,ROC}, F, T)$$

The SCR MPC supervisory control model can be summarized as follows:

$$\frac{d\theta}{dt} = f_1(\theta, u_1, u_2)$$

$$y_1 = C_{NOx,out} = f_2(\theta, u_1)$$

$$y_2 = C_{NH3,out} = f_3(\theta, u_2)$$

$$u_1 = \alpha \cdot C_{NOX,in}$$

$$u_2 = C_{NH3,in}$$

A suitable performance index is given as:

$$\min_{u_2} J = \frac{1}{N}\sum_{k=1}^{N}\left(S_1(\overline{C}_{NOX,out} - y_{1[k]})^2 + S_2 y_{2[k]}^2 + Ru_{2[k]}^2 + W(du_{2[k]})^2\right)$$

As noted above, the NOx sensor at location 242 may be cross-sensitive to $NH_3$, which means it is not possible to have a pure NOx measurement when there is $NH_3$ present at the outlet of the SCR 220, which is typical. The NOx sensor output can be modeled as:

$$y_{NOxSensor} = C_{NOx,out} + K(T, F) \cdot C_{NH3,out}$$

The scale factor K, which is a function of temperature and flow rate, can be determined by bench calibration.

Values of $C_{NH3,in}$ and $C_{NH3,out}$ used in the SCR MPC supervisory control model may be estimated from models of the SCR 220, or alternatively, may be measured by an ammonia sensor disposed at the inlet of the SCR 220 or the outlet of the SCR 220 respectively.

The methodology of the present disclosure can be extended to an embodiment having a second SCR in series with the first SCR 220 and the ROC 218. In such an embodiment, the second SCR is disposed such that the exhaust flow exiting the first SCR 220 enters the second SCR, and the exhaust flow exiting the second SCR enters the ROC 218 In a non-limiting embodiment, the first SCR 220 may account for 70% of the total SCR volume, and the second SCR may account for 30% of the total SCR volume. The first SCR 220 may be used mainly for NOx reduction, and the second SCR mainly is used to control ammonia slip and partly for NOx reduction. Initial NOx reduction takes place in the first SCR 220 where NOx in the exhaust gas from the engine reacts with NH3 stored in the first SCR 220. NOx that escapes from the first SCR 220 is reduced in the second SCR with NH3 stored in the second SCR. The NH3 stored in the first SCR 220 and the second SCR comes from the injector 236.

The approach described above for a single SCR 220 can be applied to the first SCR. To control the system operating at current levels of $C_{NOX,in}$, $C_{NOX,out}$, $C_{NH3,in}$ (NH3 concentration into the first SCR 220), $C_{NH3,mid}$ (NH3 concentration between the first SCR 220 and the second SCR), $C_{NH3,out}$, $\theta_1$ (NH3 coverage ratio of the first SCR 220), and $\theta_2$ (NH3 coverage ratio of the second SCR), new target setpoints $\overline{C}_{NOX,in}$, $\overline{C}_{NOX,out}$, $\overline{C}_{NH3,mid}$, $\overline{C}_{NH3,out}$, and $\overline{\theta}$ are calculated. It should be noted that the engine-out NOx level is the same as $C_{NOX,in}$, the input NOx level to the SCR 220. The required NH3 coverage ratio of the first SCR for NOx reduction with the new engine-out NOx target is given as:

$$\overline{\theta}_1 = \alpha \theta_1 + \frac{(\alpha - 1)F}{r_{RED}\Theta_1}, \alpha = \frac{\overline{C}_{NOX,in}}{C_{NOX,in}}$$

The NH3 coverage ratio is constrained to not exceed a maximum value for minimum NH3 slip from the first SCR 220.

$$\theta_{1max} = \frac{\overline{C}_{NH3,mid}(F + r_{ADS1}\Theta_1) - FC_{NH3,in}}{r_{ADS1}\Theta_1 \overline{C}_{NH3,mid} + r_{DES1}\Theta_1}$$

$$C_{NH3,in} \approx \frac{W_{NH3}}{W_{NOx}}(\overline{C}_{NOx,in} - C_{NOx,out}) + \overline{C}_{NH3,out}$$

Desired NH3 slip from the first SCR 220 is calculated as:

$$\overline{C}_{NH3,mid} = \overline{C}_{NH3,out} + \frac{1}{F}(r_{ADS2}\Theta_2 \overline{C}_{NH3,out}((1 - \theta_2) - r_{DES2}FW_{NH3}\Theta_2\theta_2)$$

Figure 2:
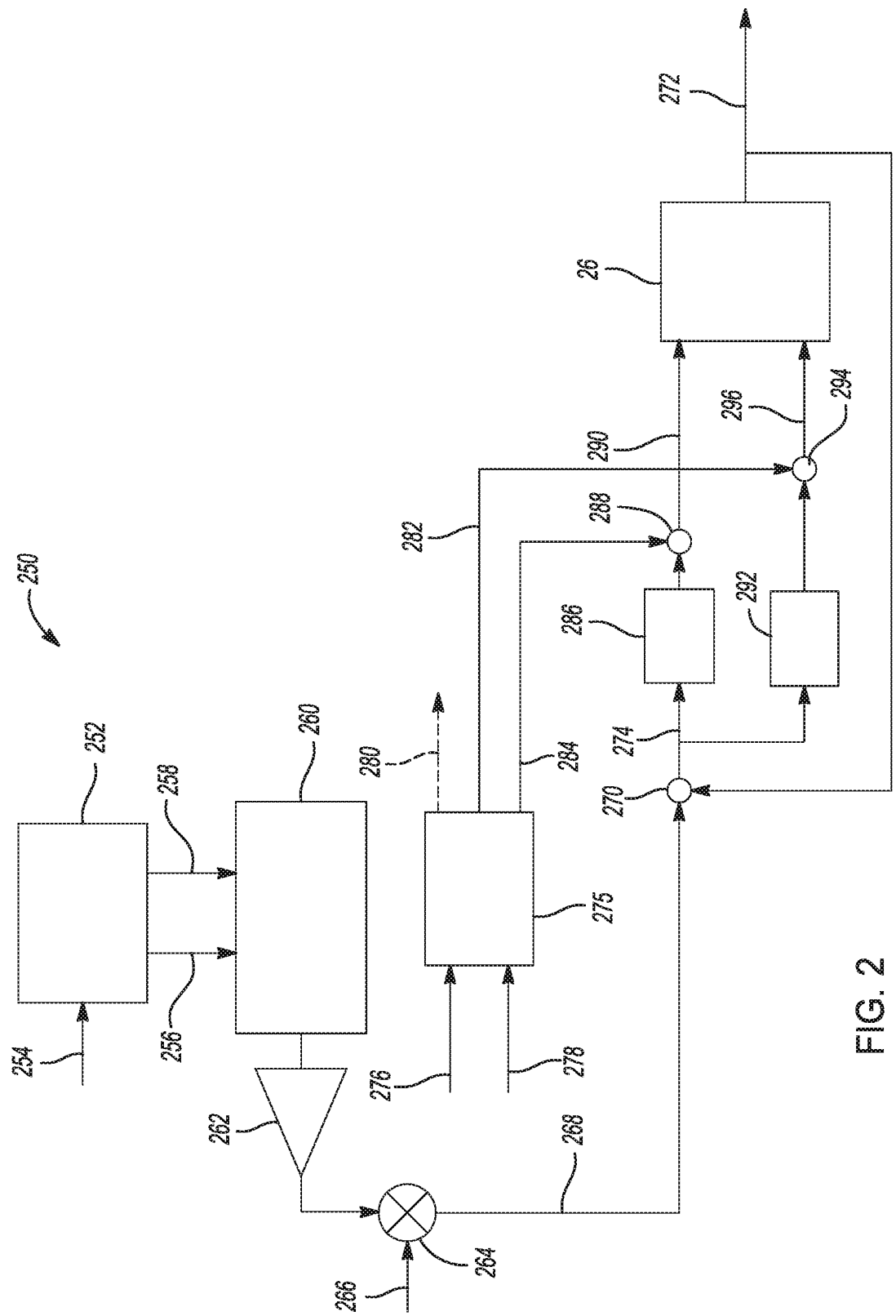
FIG. 2 is a block diagram of an integrated combustion and SCR control system which incorporates aspects of the present disclosure according to an exemplary embodiment.

FIG. 2 is a block diagram of an integrated combustion and SCR control system 250 which incorporates aspects of the present disclosure. The system 250 includes an ROC model inverse block 252, which receives as an input an NH3 slip target 254. The ROC model inverse block 252 outputs a first value 256 which represents $\overline{C}_{NH3,out}$, the target NH3 concentration from the SCR 220. The ROC model inverse block 252 also outputs a second value 258 which represents $\overline{C}_{NOx,out}$, the target NOx concentration from the SCR 220. The first value 256 and the second value 258 are used as inputs to a control margin calculation block 260, which outputs the NOx increase multiplier $\alpha$. The value of $C_{NOx,in}$, the current NOx concentration into the SCR 220, is an input 266 to a multiplier 264. The multiplier 264 produces an output value 268, which represents $\overline{C}_{NOX,in}=\alpha \cdot C_{NOX,in}$, the target engine-out NOx setpoint. The target engine-out NOx setpoint 268 is provided to a first summing junction 270, where it is combined with an engine-out NOx sensor value 272 to produce an engine-out NOx deviation value 274.

With continued reference to FIG. 2, a logic structure 275 receives as inputs an engine rpm value 276 and an engine torque value 278, and determines output values for engine fuel quantity 280, EGR flow 282, and fuel SOI (start of injection) timing 284.

Continuing to refer to FIG. 2, the engine-out NOx deviation value 274 is provided to a first PID filter 286, where proportional-integral-derivative processing is applied to the engine-out NOx deviation value 274. The filtered output of the first PID filter 286 is combined in a second summing junction 288 with the SOI value 284 from logic structure 275 to generate a modified SOI value 290. The engine-out NOx deviation value 274 is also provided to a second PID filter 292 where proportional-integral-derivative processing is applied to the engine-out NOx deviation value 274, possibly with different PID coefficients than used in the first PID filter 286. The filtered output of the second PID filter 292 is combined in a third summing junction 294 with the EGR value 282 from logic structure 275 to generate a modified EGR value 296. The engine 26 is operated using the modified SOI value 290 and the modified EGR value 296. As a result, the combustion efficiency of the engine 26 is increased by reducing EGR and by advancing the fuel injection timing. As a result, fuel consumption and $CO_2$ emissions are reduced. It will be appreciated that the logic structures illustrated in FIG. 2 may be extended to the system described above having first and second SCR devices.

An emissions control system and method of the present disclosure offers several advantages. These include utilizing otherwise unused NOx conversion capacity at steady state or quasi steady state operation to increase combustion efficiency. This has the advantage of reducing fuel consumption and CO2 emissions from the vehicle without impacting driveability. Additionally, the system and method of the present disclosure allow ammonia slip to be maintained at desirable levels even while converting additional NOx generated by the engine during high combustion efficiency operation.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An emissions control system for a motor vehicle that includes an internal combustion engine, the emissions control system comprising:
   a first selective catalytic reduction (SCR) device;
   a reductant injector; and
   a model-based controller that is configured to:
   determine an amount of NOx and an amount of NH3 at an outlet of the first SCR device;
   calculate an allowable NOx increase multiplier value that will maintain the amount of NH3 at the outlet of the first SCR device below a predetermined level;

calculate a target amount of NOx at an inlet of the first SCR device based on a present amount of NOx at the inlet of the first SCR device and the allowable NOx increase multiplier value;

send a command for receipt by an engine controller to influence NOx production by the engine by modifying an engine operating parameter, based on the calculated target amount of NOx at the inlet of the first SCR device;

calculate a target amount of reductant to inject to maintain a predetermined ratio between the amount of NH3 and the amount of NOx at the outlet of the first SCR device; and send a command for receipt by the reductant injector to inject the calculated amount of reductant.

2. The emissions control system of claim 1, wherein the allowable NOx increase multiplier value is a ratio of a targeted engine-out NOx concentration value to an engine-out NOx concentration value that would be produced by operating the engine to minimize NOx production at the current engine speed and engine torque.

3. The emissions control system of claim 1, wherein determining the amount of NH3 at the outlet of the first SCR device is based on computing a first estimated NH3 storage level for the first SCR device.

4. The emissions control system of claim 3, wherein determining the amount of NH3 at the outlet of the first SCR device is further based on receiving a NOx measurement at an inlet of the first SCR device.

5. The emissions control system of claim 1, configured such that a targeted engine-out NOx concentration value is permitted to exceed an engine-out NOx concentration value that would be produced by operating the engine to minimize NOx production at the current engine speed and engine torque only when the engine is operating at steady state or quasi steady state conditions.

6. The emissions control system of claim 1, wherein the engine operating parameter is a fuel injection timing value.

7. The emissions control system of claim 1, wherein the engine operating parameter is an EGR flow rate value.

8. The emissions control system of claim 1 further comprising an oxidation catalyst disposed downstream of the first SCR device.

9. The emissions control system of claim 1 further comprising a second SCR device disposed downstream of the first SCR device.

10. The emissions control system of claim 9 further comprising an oxidation catalyst disposed downstream of the second SCR device.

11. An exhaust system for treating exhaust gas emitted by an internal combustion engine, the exhaust system configured to perform a selective catalytic reduction (SCR) of exhaust gas, the exhaust system comprising:

at least a first SCR device;

a controller configured to control injection of a reductant into the exhaust gas, the controlling of the reductant injection comprising:

estimating a first NH3 storage level at the first SCR device;

determining an amount of NOx and an amount of NH3 at an outlet of the first SCR device;

calculating an allowable NOx increase multiplier value that will maintain the amount of NH3 at the outlet of the first SCR device below a predetermined level;

calculating a target amount of NOx at an inlet of the first SCR device based on a present amount of NOx at the inlet of the first SCR device and the allowable NOx increase multiplier value;

calculating a target amount of reductant to inject to maintain a predetermined ratio between the amount of NH3 and the amount of NOx at the outlet of the first SCR device; and sending a command to a reductant injector to inject the calculated target amount of reductant;

and wherein the controller is further configured to influence an engine control parameter, the influencing of the engine control parameter comprising:

determining if the engine is operating at steady state or quasi steady state;

in response to the engine operating at steady state or quasi steady state, sending a command for receipt by an engine controller to influence NOx production by the engine by modifying an engine operating parameter, based on the calculated target amount of NOx at the inlet of the first SCR device.

12. The exhaust system of claim 11, wherein the engine control parameter that is effective to influence engine-out NOx levels is modified so as to increase combustion efficiency of the engine.

13. The exhaust system of claim 12, wherein the engine control parameter that is effective to influence engine-out NOx levels is exhaust gas recirculation (EGR) flow rate.

14. The exhaust system of claim 12, wherein the engine control parameter that is effective to influence engine-out NOx levels is fuel injection timing.

15. A method for controlling reductant injection and fuel combustion in a system that comprises an internal combustion engine and a first selective reduction catalyst (SCR) device, the method comprising:

estimating a first NH3 storage level at the first SCR device;

determining a present amount of NOx and an amount of NH3 at an outlet of the first SCR device;

calculating an allowable NOx increase multiplier value that will maintain the amount of NH3 at the outlet of the first SCR device below a predetermined level based on the first NH3 storage level;

calculating a target amount of NOx at an inlet of the first SCR device based on the present amount of NOx at the inlet of the first SCR device and the allowable NOx increase multiplier value;

calculating a target amount of reductant to inject to maintain a predetermined ratio between the amount of NH3 and the amount of NOx at the outlet of the first SCR device;

sending a command to a reductant injector to inject the calculated amount of reductant;

determining if the engine is operating at steady state or quasi steady state;

in response to the engine operating at steady state or quasi steady state, sending a command for receipt by an engine controller to influence NOx production by the engine by modifying an engine operating parameter, based on the calculated target amount of NOx at the inlet of the first SCR device.

16. The method of claim 15, wherein the engine control parameter that is effective to influence engine-out NOx levels is modified so as to increase combustion efficiency of the engine.

17. The method of claim 16, wherein the engine control parameter that is effective to influence engine-out NOx levels is exhaust gas recirculation (EGR) flow rate.

18. The method of claim 16, wherein the engine control parameter that is effective to influence engine-out NOx levels is fuel injection timing.

* * * * *